United States Patent [19]

Snarbach

[11] 3,941,504
[45] Mar. 2, 1976

[54] WIND POWERED ROTATING DEVICE

[76] Inventor: Henry C. Snarbach, 12644 Valley View Drive, Chesterland, Ohio 44026

[22] Filed: Aug. 28, 1974

[21] Appl. No.: 501,029

[52] U.S. Cl............ 416/197 A; 416/176; 416/227 A
[51] Int. Cl.² ......................................... F03D 3/06
[58] Field of Search ....... 416/197, 198, 185, 197 A, 416/176, 227

[56] References Cited
UNITED STATES PATENTS

| | | | |
|---|---|---|---|
| 97,665 | 12/1869 | McCleave | 416/227 |
| 532,493 | 1/1895 | Kusminsky | 416/227 |
| 603,703 | 5/1898 | O'Connor | 416/227 |
| 1,027,501 | 5/1912 | Pearson | 416/198 X |
| 1,100,332 | 6/1914 | Smith | 416/198 X |
| 1,379,439 | 5/1921 | Bott | 416/227 |
| 1,824,336 | 9/1931 | Dupont | 416/53 |
| 2,059,356 | 11/1936 | James | 415/186 X |
| 2,085,411 | 6/1937 | Biehn | 416/117 |
| 2,224,851 | 12/1940 | Lea | 416/197 X |

FOREIGN PATENTS OR APPLICATIONS

| | | | |
|---|---|---|---|
| 611,080 | 9/1926 | France | 416/197 |
| 782,616 | 2/1935 | France | 416/186 |
| 563,253 | 11/1932 | Germany | 416/9 |
| 347,067 | 3/1937 | Italy | 416/185 |

*Primary Examiner*—Everette A. Powell, Jr.
*Attorney, Agent, or Firm*—William N. Hogg

[57] ABSTRACT

An omni-directional windmill device comprising a plurality of blades circumferentially symetrically disposed with respect to each other. Each of the blades is generally helicoidal in shape. Also, a sleeve and ball type mounting device for a windmill device is disclosed.

5 Claims, 3 Drawing Figures

WIND POWERED ROTATING DEVICE

BACKGROUND OF THE INVENTION

This invention relates generally to wind powered rotating devices generally referred to as windmills, and more particularly to windmills which are omnidirectional, i.e. the windmill will rotate no matter which direction the wind is blowing without having to be rotated or specially set.

The harnessing of wind power to produce useful work is one of the oldest endeavors of mankind. There have been many prior art proposals for wind powered devices which will perform useful work such as pumping water, driving generators or turbines, and just generally operating machines.

SUMMARY OF THE INVENTION

According to the present invention a windmill device is provided which has a plurality of circumferentially symetrically spaced blades, each of which blades has a wind catching surface which is arcuate in transverse cross section, and which is generally helicoidal or spiral vertically. Preferably the device is mounted by means of a rod extending into a sleeve with a single ball member disposed between the end of the sleeve and the end of the rod to provide almost frictionless rotation.

DESCRIPTION OF THE PREFERRED EMBODIMENT

Figure 1:
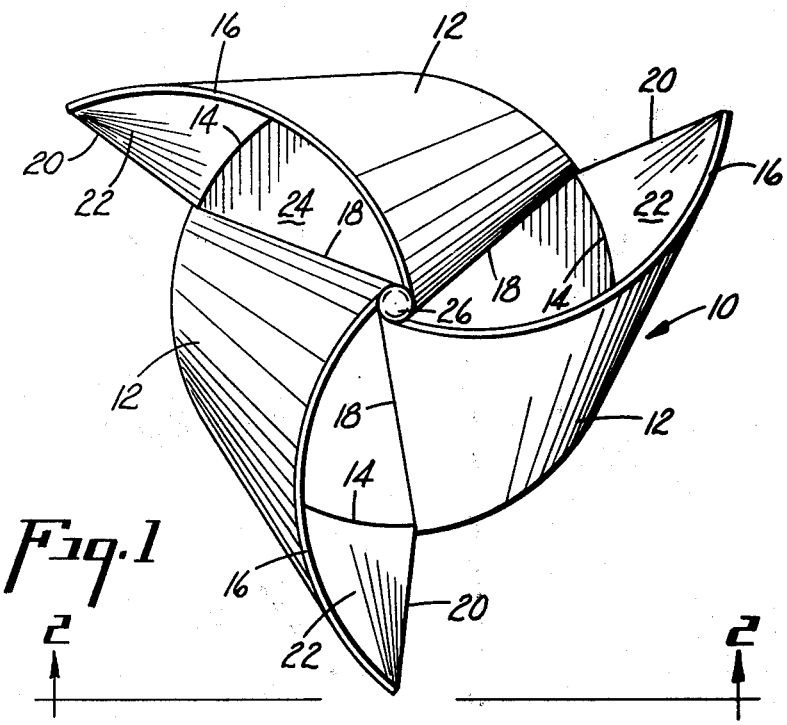
FIG. 1 is a top plan view of a windmill device according to this invention.
Figure 2:
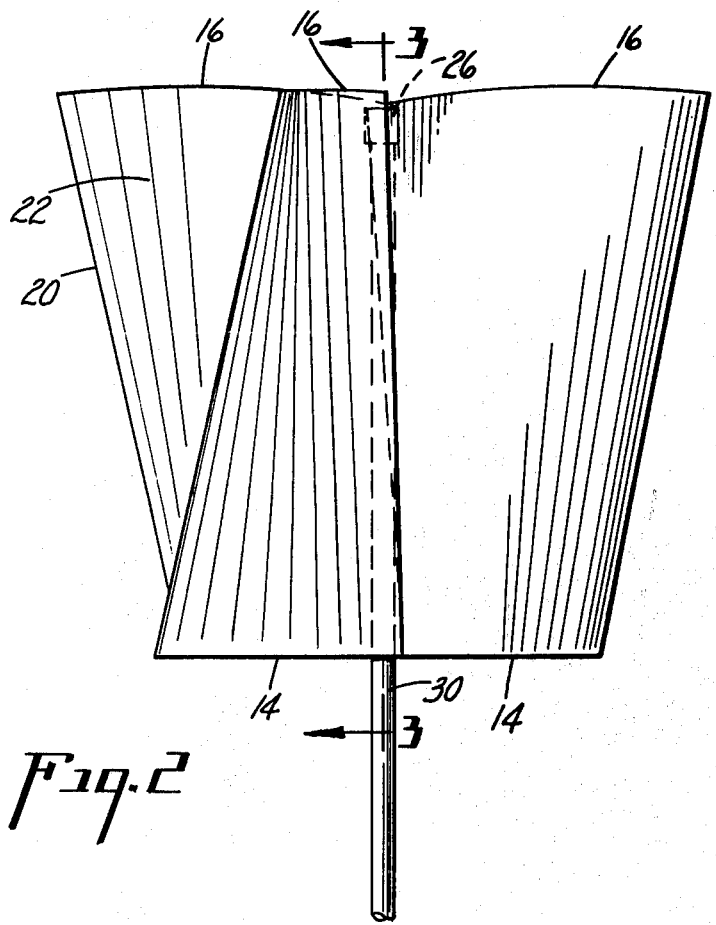
FIG. 2 is an elevational view taken looking substantially along the plane designated by the line 2—2 in FIG. 1.
Figure 3:
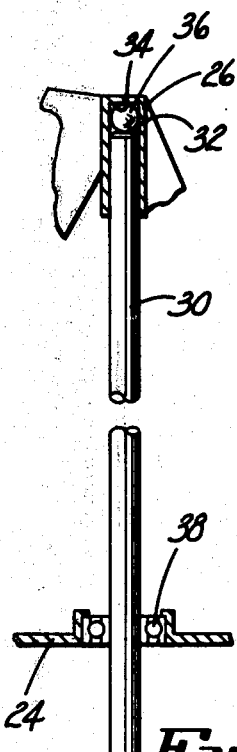
FIG. 3 is a longitudinal sectional view taken substantially along the line 3—3 of FIG. 2.

Referring now to the drawing, the windmill device of the present invention includes a rotating device 10 which includes a plurality of blades 12. In the preferred embodiment there are three blades shown, but it is understood that four or more blades can also be equally well employed and in fact it is possible, although not desirable, to have only two blades. The blades, whatever their number, must be circumferentially symetrically disposed with respect to each other so that the device is properly balanced. They must also be symetrically shaped with respect to each other to provide proper balance.

Each of the blades 12 is formed with a lower edge 14 and upper edge 16, the lower edges 14 and upper edges 16 lying on vertically spaced parallel planes. Each of the blades also has an inner edge 18 and an outer edge 20. The blades are each formed to provide a generally helicoidal wind catching surface 22. This is done by forming the lower edges 14 of the blades so that together they are arranged in generally a circular pattern, and securing these blades by means of a circular lower plate 24. The blades are then bent so that one corner of the upper edges 16 are each secured to a cylindrical tubular sleeve member 26 which is disposed centrally but axially spaced from the lower plate 24, the center of which member 26 lies on the axis of the circle defined by the plate 24 normal to the center thereof. The upper edges 16 of the plates then spiral outwardly from this sleeve member 26 so that the overall effect of the configuration is a blade which has a surface 22 which is helicoidal or spiral in shape.

The device is preferably mounted for rotation on a pole 30. The mounting is by means of a single ball 36 disposed within the sleeve 46 which rests on the horizontal end surface 32 of the pole 30 and allows the end surface 34 of the sleeve 36 to rest thereon. This provides a nearly frictionless mounting of the device and allows free rotation. If desired, to provide stability, a ball bearing 38 can be inserted in the lower plate 24 in an appropriate aperture (unnumbered) through which the pole 30 extends and inserts into the sleeve 26. Alternatively, a sleeve could be employed which is of sufficient length to extend through the lower plate 34 and the ball bearing 38 would be inside the sleeve.

Suitable power takeoff means (not shown) can be provided to translate rotating motion of the device into mechanical power.

It has been observed that windmills constructed according to the present invention very effectively utilize any available wind quickly attaining a very high velocity with a substantial amount of power generated. In fact, comparison to other omni-directional windmill devices has shown that a windmill device constructed according to the present invention attains a significantly higher rotational velocity in the same wind when mounted in a similar fashion. The reason for this is not understood, although it is believed that the helicoidal shape of the blades effectively catches and utilizes to the maximum extent the force and velocity of the blowing wind providing an exceptional rotating wind powered device.

What is claimed is:

1. An omni-directional windmill device comprising, a plurality of blades circumferentially symetrically disposed with respect to each other, each of said blades having a lower edge and upper edge, each of said blades having a wind reaction surface being arcuate in transverse cross section and helically formed longitudinally from said lower to said upper edge, said lower edges lying on a circle, said upper edges having one end which terminates at a common location within a projection of said circle on the plane of said edges, each of the upper edges curving arcuately from said common location to a point, the locus of which points lie on a circle radially spaced from said common location, and means to mount said device for rotation.

2. The invention as defined in claim 1 wherein the inner termination of the upper edges are secured to a member.

3. The invention as defined in claim 1 wherein said member includes means to support said device for rotation.

4. The invention as defined in claim 1 further characterized by a disc member securing said lower edges.

5. The invention as defined in claim 1 wherein the circle of the locus of said points of the ends of the upper edges is larger than the circle of said lower edges.

* * * * *